(12) United States Patent
Shimada et al.

(10) Patent No.: US 7,073,185 B2
(45) Date of Patent: Jul. 4, 2006

(54) OBJECTIVE LENS DRIVING DEVICE AND OPTICAL PICKUP DEVICE EMPLOYING THE OBJECTIVE LENS DRIVING DEVICE

(75) Inventors: Yutaka Shimada, Tokyo (JP); Tadayasu Nishikawa, Ibaraki (JP)

(73) Assignee: Sony Corporation (JP)

( * ) Notice: Subject to any disclaimer, the term of this patent is extended or adjusted under 35 U.S.C. 154(b) by 501 days.

(21) Appl. No.: 10/258,467

(22) PCT Filed: Feb. 28, 2002

(86) PCT No.: PCT/JP02/01867

§ 371 (c)(1),
(2), (4) Date: Mar. 18, 2003

(87) PCT Pub. No.: WO02/069333

PCT Pub. Date: Sep. 6, 2002

(65) Prior Publication Data

US 2003/0161251 A1    Aug. 28, 2003

(30) Foreign Application Priority Data

Feb. 28, 2001    (JP) .............................. 2001-55937

(51) Int. Cl.
*G11B 7/00*    (2006.01)

(52) U.S. Cl. .................................... 720/683

(58) Field of Classification Search ................ 720/683; 369/44.14–44.16
See application file for complete search history.

(56) References Cited

U.S. PATENT DOCUMENTS

| | | | |
|---|---|---|---|
| 5,253,402 A | 10/1993 | Kasahara | ...................... 29/173 |
| 5,521,762 A * | 5/1996 | Tomiyama et al. | .......... 359/814 |
| 5,555,228 A * | 9/1996 | Izuka | ...................... 369/44.15 |
| 5,581,533 A * | 12/1996 | Fujisawa | ................ 369/112.23 |
| 5,715,231 A | 2/1998 | Nagasato et al. | ........... 369/247 |
| 5,719,834 A | 2/1998 | Futagawa et al. | ......... 369/44.14 |
| 5,886,978 A | 3/1999 | Matsui | ....................... 369/244 |

FOREIGN PATENT DOCUMENTS

| | | |
|---|---|---|
| JP | 5128586 | 5/1993 |
| JP | 1109572 | 4/1999 |

* cited by examiner

*Primary Examiner*—A. J. Heinz
*Assistant Examiner*—Mark Blouin
(74) *Attorney, Agent, or Firm*—Lerner, David, Littenberg, Krumholz & Mentlik, LLP

(57) ABSTRACT

The present invention is relative with an objective lens driving device used in an optical pickup device, and includes a stationary unit, a lens bobbin provided with an objective lens, at least one magnet provided on one of the lens bobbin and the stationary unit, a coil unit provided on the other of the lens bobbin and the stationary unit for causing movement of the lens bobbin in a direction parallel to the optical axis of the objective lens and in a planar direction perpendicular to the optical axis of the objective lens, and an elastic supporting unit of a stainless material, provided between a stationary unit and the lens bobbin. The elastic supporting unit supports the lens bobbin for movement in a direction parallel to the optical axis of the objective lens and in a planar direction perpendicular to the optical axis of the objective lens.

10 Claims, 7 Drawing Sheets

OBJECTIVE LENS DRIVING DEVICE AND OPTICAL PICKUP DEVICE EMPLOYING THE OBJECTIVE LENS DRIVING DEVICE

This application is a 371 of PCT/JP02/01867 Feb. 28, 2002.

TECHNICAL FIELD

This invention relates to an optical pickup device, used for writing information signals on an optical recording medium, such as an optical disc, and for reading out the information signals, recorded on this recording mediwn, and to an objective lens driving device which may be usefully applied to this optical pickup device.

BACKGROUND ART

An optical pickup device is routinely used for writing information signals on an optical recording medium, such as an optical disc, and for reading out the information signals recorded on this recording medium. This type of the optical pickup device includes a main body unit, provided with a light source, such as a semiconductor laser, and with a light receiving element, such as a photodiode, an objective lens, on which falls a light beam radiated from the light source, and a driving mechanism for deflecting this objective lens in a preset direction, which will be explained subsequently.

This objective lens driving mechanism supports an objective lens, adapted for converging the light beam, radiated from a light source, along a direction of the optical axis of the objective lens, that is in the focusing direction, and along a direction perpendicular to the optical axis, that is in the tracking direction, while causing the objective lens to be deflected by an electromagnetic actuator in the focusing and tracking directions. The objective lens driving mechanism causes movement of this objective lens to be moved along the direction of the optical axis of the objective lens and along the direction perpendicular to the optical axis to cause a light spot formed by this objective lens on a signal recording surface of the optical recording medium to follow a recording track on the signal recording surface of the optical recording medium. That is, the objective lens driving mechanism causes the objective lens to be moved along the direction of the optical axis of the objective lens, that is in the focusing direction, to execute focusing control of converging the light beam radiated from the light source on the signal recording surface. The objective lens driving mechanism also causes the objective lens to be moved in the focusing direction along the optical axis of the objective lens, and in the tracking direction, that is in a direction perpendicular to the tangential line of the recording track, to cause a light converging point of the light beam radiated from the light source to follow the recording track, by way of performing tracking adjustment.

The objective lens driving mechanism includes a stationary unit, mounted on the main body unit, a lens bobbin, carrying the objective lens, and a supporting member interconnecting the stationary unit and the lens bobbin. The supporting unit is made up by four flexible fine linear members and supports the lens bobbin for movement along the direction parallel to the optical axis and along the direction perpendicular to the optical axis with respect to the stationary unit. That is, each of the linear members making up the supporting unit has its one end mounted on the stationary unit, while having its other end mounted on the lens bobbin.

The stationary unit is provided with a magnetic circuit unit comprised of a magnet and a yoke. On the lens bobbin are mounted a driving coil for focusing and another driving coil for tracking, both mounted in a magnetic field generated by a magnet constituting the magnetic circuit unit. In this objective lens driving mechanism, when the current is supplied to the driving coil for focusing, the driving coil for focusing is moved, along with the lens bobbin, along the direction of the optical axis of the objective lens, together with the lens bobbin, under the interaction with the magnetic field generated by the magnetic circuit unit. When the current is supplied to the driving coil for tracking, the driving coil for tracking is moved, along with the lens bobbin, in the direction perpendicular to the optical axis of the objective lens, along with the lens bobbin, under the interaction with the magnetic field generated by the magnetic circuit unit. By this interaction between the respective driving coils and the magnetic circuit unit, focusing control and tracking control are executed so that the light spot of the light beam radiated from the light source and converged on the signal recording surface by the objective lens will follow up with vertical movement of the signal recording surface and with the recording track.

In this objective lens driving mechanism, current supply to the respective driving coils is via the respective linear members forming the supporting unit. Consequently, these linear members are desirably formed of a material which is low in electrical resistance and which does not produce resonance in the frequency range used, for example, such a material as beryllium copper. Meanwhile, these linear members are of a thickness of the order of 80 μm, a width up to 80 to 90 μm and a length of the order of 15 to 20 mm.

In the above-described objective lens driving device, since the four linear members forming the supporting unit are used as feeder lines for the driving coil for focusing and for the driving coil for tracking, and hence need to be electrically independent of and electrically insulated from each other. Therefore, the linear members forming the supporting unit must be formed as respectively separate members.

These linear members were difficult to form to high precision in a manner free from distortion or flexure. These linear members are formed by first punching a plate member, and by providing a unit comprised of plural linear members 101, 101 lying within a frame-shaped frame 102, with the ends of the linear members being secured to the inner side edges of the frame 102, as shown in FIG. 1. The linear members 101, 101 then are severed from the frame 102. However, when severed from the frame 102, the linear members 101 tend to be distorted or flexed.

It may be contemplated to interconnect both ends of the two linear members 101, 101, neighboring to the objective lens driving mechanism, by synthetic resin components 103, 103, by insert molding, as the plural linear members 101, 101 are supported by the frame 102, thereby suppressing torsion or flexure of the linear members 101, 101. In this case, both ends of the two linear members 101, 101 are severed from the frame 102, as both ends of the linear members 101, 101 remain connected to the synthetic resin components 103, 103. The resulting unit is used in this state as the objective lens driving device. If the linear members 101, 101 are connected by the synthetic resin components 103, 103 to the frame as described above, the resulting unit becomes thicker than the liner members per se. The unit carrying the linear members 101, 101 thus connected is locally different in thickness, so that, if a plural number of such units are stacked directly together, the linear members 101, 101 tend to be deformed. For transporting the units, carrying the linear members 101, 101, thus connected, in a state of preventing the linear members 101 from becoming deformed, dedicated packing materials need to be used. If a large number of the units, carrying the linear members 101, 101, are to be packaged and transported, the packages for transport, employing the dedicated packaging materials, are bulky in size, to render it impossible to improve the transport efficiency.

Moreover, beryllium copper, retained to be convenient as a material forming the above-mentioned linear members, is difficult to procure, while being costly.

DISCLOSURE OF THE INVENTION

It is therefore an object of the present invention to provide an objective lens driving device, in which linear members supporting a lens bobbin may readily be formed, the supporting members may be packaged and transported readily and in which the materials of the supporting members can be procured easily and manufactured inexpensively. It is another object of the present invention to provide an optical pickup device employing this objective lens driving device.

For accomplishing the above object, the present invention provides an objective lens driving device including a lens bobbin provided with an objective lens, at least one magnet provided on the lens bobbin, a coil unit for causing movement of the lens bobbin along with the magnet in a direction parallel to the optical axis of the objective lens and in a planar direction perpendicular to the optical axis of the objective lens, a stationary unit provided with the coil unit, and an elastic supporting unit of a stainless material, provided between the stationary unit and the lens bobbin; the elastic supporting unit supporting the lens bobbin for movement in a direction parallel to the optical axis of the objective lens and in a planar direction perpendicular to the optical axis of the objective lens.

The elastic supporting unit includes a plurality of linear supporting members each having its one end mounted to the lens bobbin and having its opposite end to the stationary unit.

The elastic supporting unit includes a first elastic supporting part and a second elastic supporting part, each constructed as two connecting pieces, each of the connecting pieces interconnecting both ends of two of the plural supporting members so that the two supporting members extend parallel to each other.

The first and second elastic supporting parts are formed on punching a stainless sheet material into a stainless plate member.

The stationary unit includes a plurality of grooves adapted for receiving the opposite ends of the plural supporting members. In each groove, there is provided a damper in contact with the opposite end of the associated supporting member.

A substantially rectangular frame-shaped yoke is provided in the lens bobbin, two magnets are provided at a preset distance between two facing inner wall sections of the yoke and wherein the coil unit is provided between the magnets.

The present invention also provides an objective lens driving device including a stationary unit, a lens bobbin provided with an objective lens, at least one magnet provided on one of the lens bobbin and the stationary unit, a coil unit provided on the other of the lens bobbin and the stationary unit and adapted for supporting the lens bobbin for movement in a direction parallel to the optical axis of the objective lens and in a planar direction perpendicular to the optical axis of the optical axis of the objective lens, and an elastic supporting unit of a stainless material, provided between the stationary unit and the lens bobbin; the elastic supporting unit supporting the lens bobbin for movement in a direction parallel to the optical axis of the objective lens and in a planar direction perpendicular to the optical axis of the objective lens.

The present invention also provides an optical pickup device including a light source, an objective lens driving device, and a photodetector for detecting the light beam incident thereon via the objective lens. The objective lens driving device includes a lens bobbin, provided with an objective lens for converging a light beam radiated from the light source, a stationary unit having an opening for guiding the light beam radiated from the light source to the objective lens, at least one magnet mounted on one of the lens bobbin and the stationary unit, a coil unit provided on the other of the lens bobbin and the stationary unit and adapted for causing movement of the lens bobbin in a direction parallel to the optical axis of the objective lens and in a planar direction perpendicular to the optical axis of the objective lens, and an elastic supporting unit of a stainless material provided between the stationary unit and the lens bobbin for supporting the lens bobbin for movement in a direction parallel to the optical axis of the objective lens and in a planar direction perpendicular to the optical axis of the objective lens.

Other objects, features and advantages of the present invention will become more apparent from reading the embodiments of the present invention as shown in the drawings.

BEST MODE FOR CARRYING OUT THE INVENTION

The present invention is now explained with reference to an embodiment thereof as applied to an objective lens driving device used for recording information signals on an optical disc as an optical recording medium and for reading out the information signals recorded on the recording medium.

Figure 1:
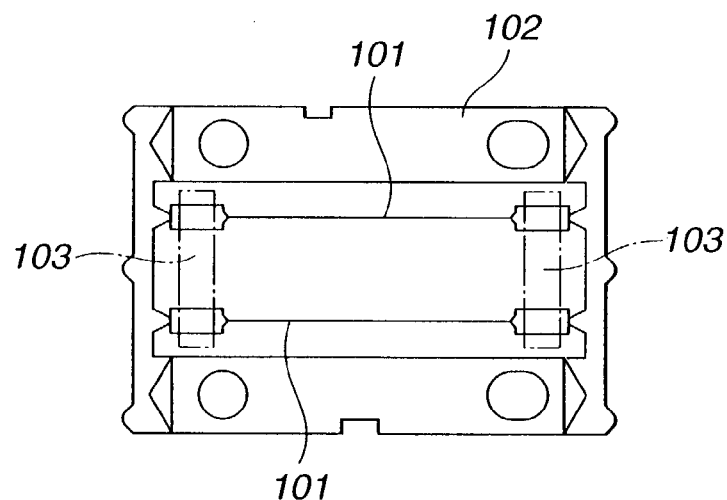
FIG. 1 is a plan view showing a supporting member used for a conventional objective lens driving device.
Figure 2:
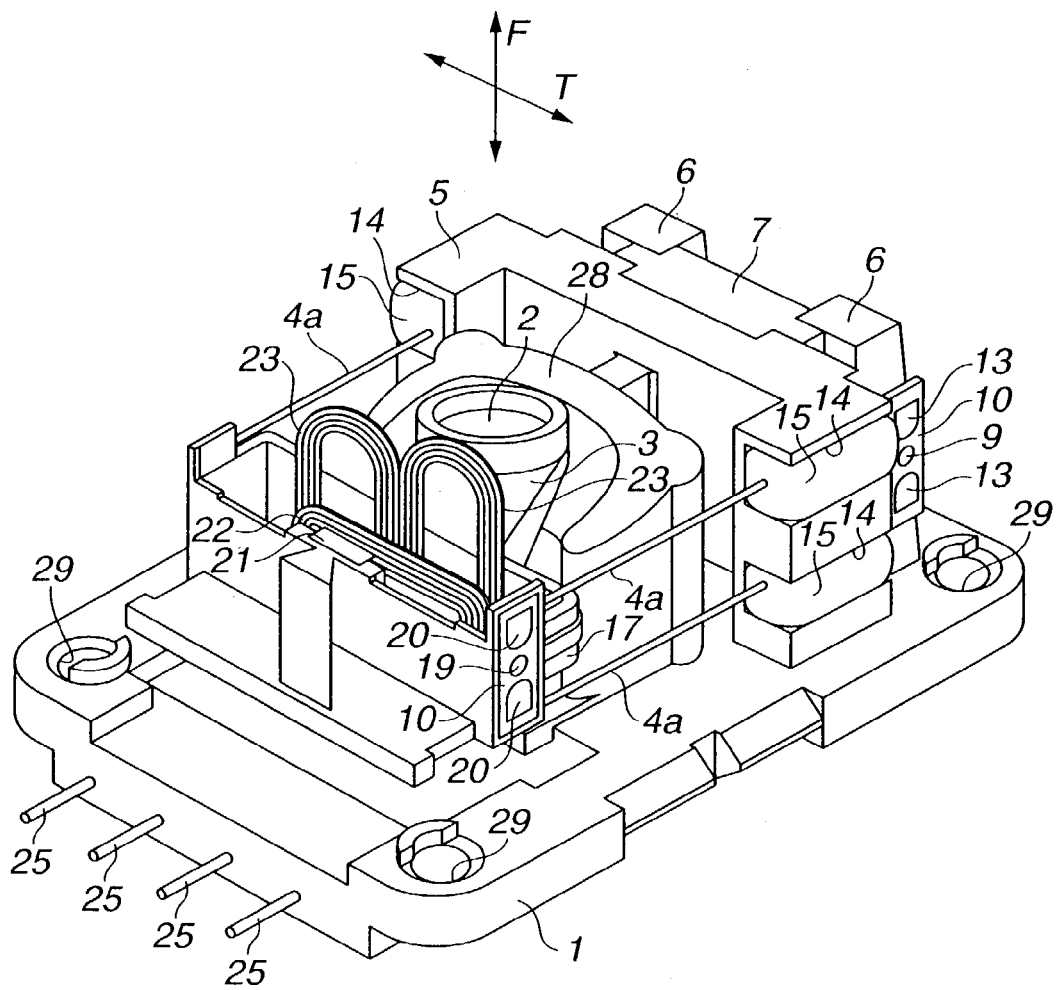
FIG. 2 is a perspective view showing an objective lens driving device according to the present invention.
Figure 3:
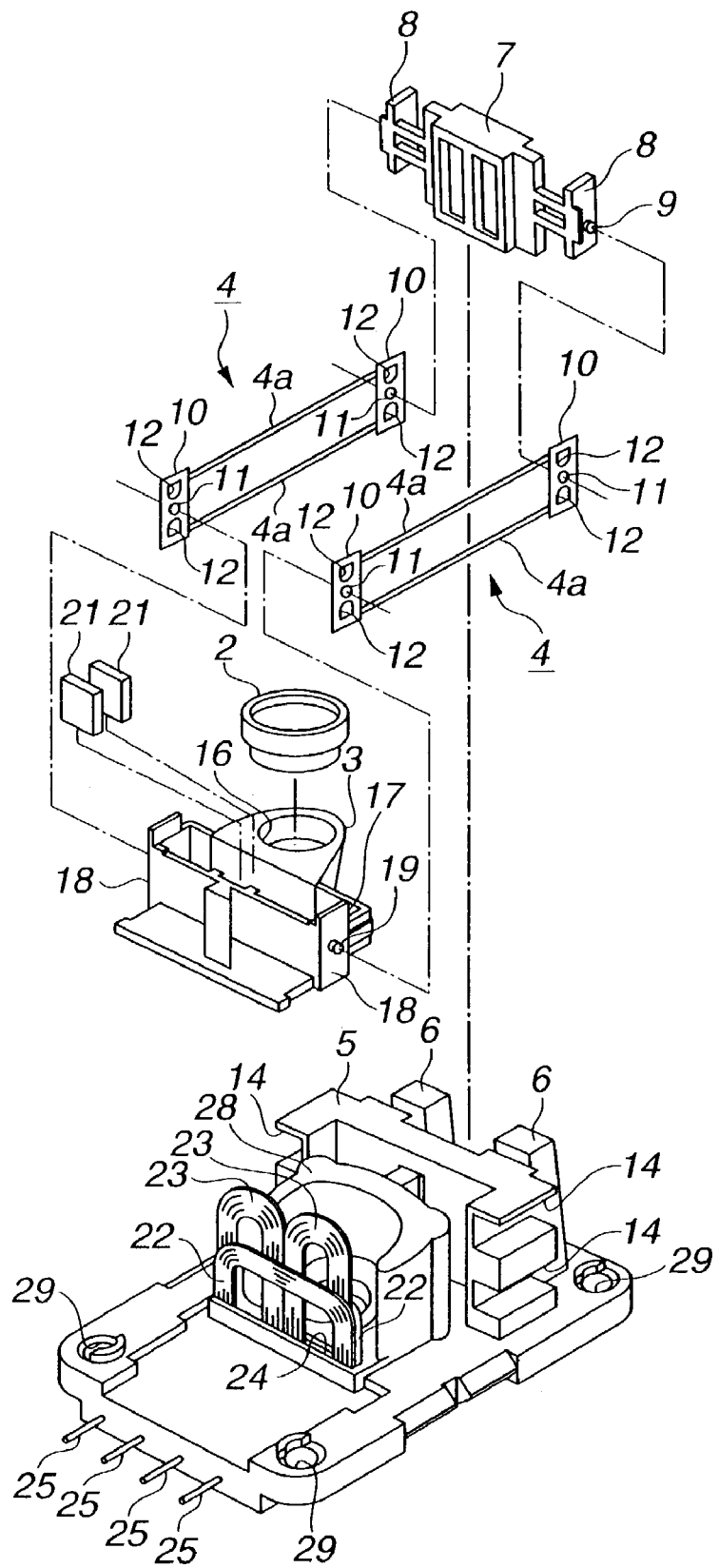
FIG. 3 is an exploded perspective view showing the objective lens driving device according to the present invention.
Figure 4:
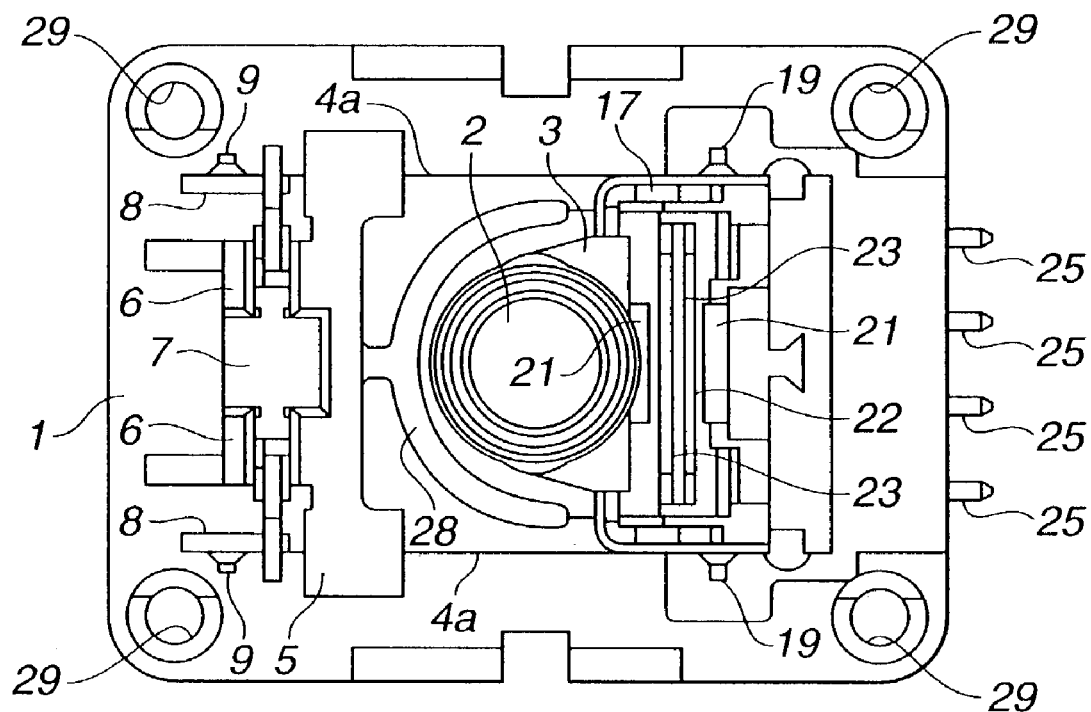
FIG. 4 is a plan view showing the objective lens driving device according to the present invention.

Referring to FIGS. 2 to 4, the objective lens driving device according to the present invention includes a base member 1, as a stationary unit, a lens bobbin 3, carrying an objective lens 2, and four supporting members 4a, as an elastic supporting unit, interconnecting the stationary unit and the lens bobbin.

The base member 1 is formed as a unitary member, from a synthetic resin material, as a substantially planar member. On the upper rear surface of the base member 1, there are formed upright a supporting plate 5 and a pair of supporting pillars 6, 6. Between the supporting plate 5 and the supporting pillars 6, 6 is mounted a substantially flat mounting plate 7 with light press fitting. The mounting plate 7 is mounted in position by being introduced into a space between the supporting plate 5 and the supporting pillars 6, 6. This mounting plate 7 carries a pair of mounting arms 8, 8 on its both sides, as shown in FIG. 3. The mounting arms 8, 8 are formed as arms protruded on both sides from the mounting plate 7, with the foremost flat parts thereof extending parallel to each other. At mid portions of the foremost flat parts of the mounting arms 8, 8 are formed positioning projections 9.

The supporting members 4a are formed as fine flexible linear members, and support the lens bobbin 3 for movement in a direction indicated by arrow F and in a direction indicated by arrow T in FIG. 2 with respect to the base member 1. That is, each supporting member 4a has its one end and its other end mounted on the base member 1 and on the lens bobbin 3, respectively, as shown in FIGS. 2 to 4. The two supporting members 4a, lying in a direction parallel to the optical axis of the objective lens 2, are grouped together as a set and have their respective ends connected together by connecting pieces 10, 10. These supporting members 4a are formed as one unitary unit from a stainless material, as the supporting member 4a run parallel to each other and to the optical axis of the objective lens 2, as shown in FIG. 3. That is, the two supporting members 4a, 4a and the two connecting pieces 10, 10 are punched respectively as one unit from a sheet of a stainless material and are coupled together in a manner which will be explained subsequently.

Each of the connecting pieces 10, 10 is formed at its mid portion with a positioning hole 11. The positioning hole 11 of the connecting piece 10 provided at one end is circular, while the positioning hole 11 of the connecting piece 10 provided at the opposite end is an elliptical hole having its long axis along the direction parallel to the supporting members 4a. On both sides of the positioning hole 11 of each of the connecting pieces 10, 10 is formed a pair of bonding holes 12, 12.

Referring to FIG. 3, the positioning projections 9 of the mounting arms 8, 8 are inserted into the positioning holes 11 of the connecting pieces 10, 10 on one side and an adhesive 13 is applied to the bonding holes 12, 12 to secure the connecting pieces 10, 10 to the end faces of the mounting arms 8, 8 to secure elastic supporting units 4, 4 to the end faces of the mounting arms 8, 8. At this time, the supporting members 4a, 4a, 4a, 4a are supported in a cantilevered fashion for extending in a forward direction formed the mounting arms 8, 8 over the lateral sides of the supporting plate 5, as shown in FIG. 2. The two elastic supporting units 4, 4 are mounted between the lens bobbin 3 and the supporting plate 5, on both sides of the objective lens 2, so as to be parallel to each other, as shown in FIG. 2 or 4. With the connecting pieces 10, 10 on one sides of the supporting members 4a, 4a mounted to the mounting arms 8, 8 on both sides, the sum of four supporting members 4a, 4a are carried by the respective mounting arms 8, 8 for extending forwards in a cantilevered fashion over the lateral sides of the supporting plate 5, in a direction parallel to each other, as shown in FIG. 2.

Figure 5:
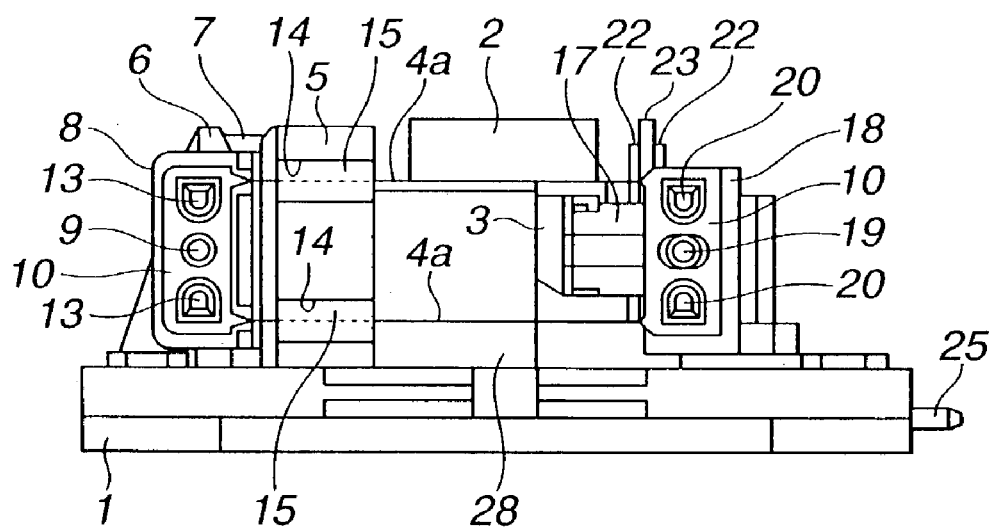
FIG. 5 is a side view thereof.

In both lateral sides of the supporting plate 5 are formed upper and lower paired damper holding grooves 14, 14, as shown in FIGS. 2, 3 and 5. The elastic supporting units 4, 4 are carried by the mounting arms 8, 8 through the damper holding grooves 14, 14 for extending in a forward direction, as shown in FIG. 2. In these damper holding grooves 14, 14 are charged gelated dampers 15 formed of a silicon-based material. These dampers 15 are contacted with rim portions, specifically, one end portions, of the elastic supporting units 4, 4, as shown in FIG. 2. The result is that oscillation characteristics of a movable unit, including the lens bobbin 3, supported by this elastic supporting units 4, 4, as later explained, are corrected by the dampers 15.

The lens bobbin 3 is mounted on the connecting pieces 10, 10 lying on the opposite side of the respective elastic supporting units 4, 4. The lens bobbin 3, formed of a synthetic resin material, includes an objective lens mounting hole 16, as a through-hole, as shown in FIG. 3. The lens bobbin 3 includes a yoke 17 formed of a high magnetic permeability material. In this objective lens mounting hole 16 is mounted the objective lens 2, such as an aspheric lens. The yoke 17 is formed as a rectangular frame, as shown in FIGS. 3 and 4, and is unified to the lens bobbin 3 by insert molding. In this lens bobbin 3, the objective lens mounting hole 16 is provided at a mid portion of the lens bobbin 3, while the yoke 17 is positioned forwardly of the objective lens mounting hole 16 of the lens bobbin 3, as shown in FIGS. 3 and 4. The lens bobbin 3 is provided with a pair of mounting surfaces 18, 18 lying on both sides of the yoke 17. These mounting surfaces 18, 18 are planar and formed so as to be parallel to each other. At mid portions of the respective mounting surfaces 18, 18 are formed positioning protuberances 19, 19.

The elastic supporting units 4, 4 are mounted on the respective mounting surfaces 18, 18, as shown in FIG. 2, as the positioning protuberances 19, 19 provided on the mounting surfaces 18, 18 of the lens bobbin 3 are inserted into the positioning holes 11 of the opposite side connecting pieces 10, 10, and as an adhesive 20 is subsequently coated and charged into the bonding holes 12, 12 for bonding the connecting pieces 10, 10 and the mounting surfaces 18, 18 to each other with the adhesive 20. In this manner, the lens bobbin 3 is supported by the four supporting members 4a, 4a, 4a, 4a. At this time, the objective lens 2 is mounted so that its optical axis will be perpendicular to the upper surface of the base in member 1. At a mid portion of the base member 1 in register with the so mounted objective lens 2, there is bored a through-hole as an opening through which is transmitted the light beam so as to be incident on the objective lens 2.

The elastic supporting units 4, 4 are formed of stainless material and hence is flexible, so that it is movable in a focusing direction which is parallel to the optical axis of the objective lens 2, as indicated by arrow F in FIG. 2, and in a planar tracking direction which is perpendicular to the optical axis of the objective lens 2, as indicated by arrow T in FIG. 2. When the lens bobbin 3 is moved in this manner in the directions indicated by arrows F or T in FIG. 2, there is no risk of the optical axis of the objective lens 2 becoming tumbled or tilted, because the lens bobbin 3 is carried by the four supporting members 4a.

The lens bobbin 3 is provided with a pair of magnets 21, 21 forming a magnetic circuit unit in cooperation with the yoke 17. The magnets 21, 21, forming the magnetic circuit unit, are each formed to a rectangular shape, and are mounted by the inner wall section of the yoke 17, formed to a rectangular frame shape, as described above, in a facing relationship to each other via a preset gap, as shown in FIG. 3. These magnets 21, 21 are mounted at a mid portion of the forward side inner wall section and at a mid portion of the rear side inner wall section, as shown in FIG. 4. By these magnets 21, 21 and the yoke 17, there is generated, at a mid portion within the inside of the yoke 17, that is in a spacing defined between the magnets 21, 21, a magnetic field in which the direction of the magnetic flux is along the forward and backward direction.

The lens bobbin 3, inclusive of the yoke 17, the objective lens 2 mounted on this lens bobbin 3, the connecting pieces 10, 10, lying on the opposite side of the elastic supporting units 4, 4, the adhesive 20 and the magnets 21, 21, mounted on the yoke 17, make up a movable unit in the objective lens driving device.

The base member 1 carries focusing driving coils 22, 22 and tracking driving coils 23, 23, so that these coils will be located in the magnetic field generated by the magnets 21, 21 forming the above-mentioned magnetic circuit unit. The focusing driving coils 22, 22 are each formed by winding an electrically conductive linear member in the form of a horizontally elongated ellipse, while the tracking driving coils 23, 23 are each formed by winding an electrically conductive linear member in the form of a longitudinally elongated ellipse. These focusing driving coils 22, 22 and tracking driving coils 23, 23 are carried at the respective lower sides in driving coil holding grooves 24 formed in the upper surface of the base member 1, as shown in FIG. 3. The tracking driving coils 23, 23 are held side-by-side in the holding groove 24, while the focusing driving coils 22, 22 are held in the holding groove 24 for sandwiching the tracking driving coils 23, 23 from the forward and rear sides, as shown in FIGS. 2 to 4.

Figure 6:
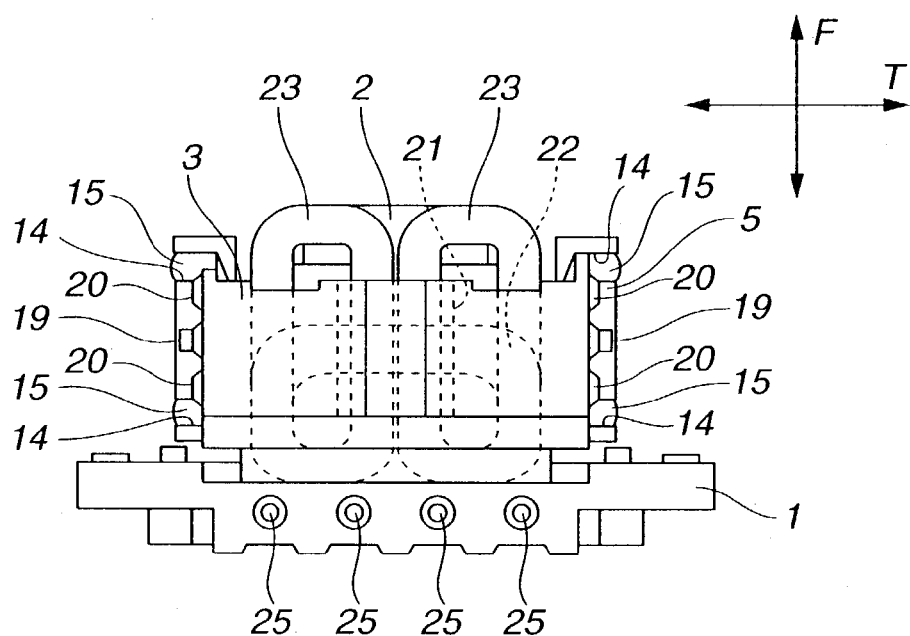
FIG. 6 is a front view thereof.

The focusing driving coils 22, 22 and the tracking driving coils 23, 23 are introduced into the gap defined between the magnets 21, 21 within the yoke 17 of the lens bobbin 3, in the form of a rectangular frame, as shown in FIG. 6. The upper horizontal linear portions of the focusing driving coils 22, 22 and linear vertical portions of the mutually adjacent sides of the tracking driving coils 23, 23 intersect each other at the center within the inside of the yoke 17. The intersecting portions of the focusing driving coils 22, 22 and the tracking driving coils 23, 23 are located in a spacing between the magnets 21, 21.

The base member 1 is provided with four terminals 25 held within the base member 1 and having foremost parts protruded forwards from the front end thereof, as shown in FIG. 3. These terminals 25 are connected to one ends of the focusing driving coils 22, 22, to opposite ends thereof, to one ends of the tracking driving coils 23, 23 and to the opposite ends thereof, by outlet lines, not shown. As a result, the focusing servo signals and tracking servo signals are supplied as driving signals to the focusing driving coils 22, 22 and tracking driving coils 23, 23. The outlet lines are connected through the inside of the base member 1 to the respective terminals 25 and to the respective driving coils 22, 22 and 23, 23.

If, in the present objective lens driving device, the focusing servo signals are sent to the focusing driving coils 22, 22, the objective lens 2 is moved, along with the lens bobbin 3, in the focusing direction parallel to the optical axis of the objective lens 2, as indicated by arrow F in FIG. 6, under the interaction of the magnetic field generated by the magnets 21, 21 forming the magnetic circuit unit and that generated by the focusing driving coils 22, 22. If, in this objective lens driving device, the tracking servo signals are sent to the tracking driving coils 23, 23, the objective lens 2 is moved, along with the lens bobbin 3, in the tracking direction perpendicular to the optical axis of the objective lens 2, as indicated by arrow T in FIG. 6, under the interaction of the magnetic field generated by the magnets 21,21 forming the magnetic circuit unit and that generated by the tracking driving coils 23, 23. This interaction between the respective driving coils 22, 23 and the magnetic circuit unit provides for focusing and tracking control in the optical pickup device as will be explained subsequently.

On the base member 1, a semi-cylindrical dust-proofing wall section 28 is formed upright as one with the base member 1 for surrounding the lens bobbin 3, outside its movement sphere, as shown in FIGS. 2, 3 and 4.

In the objective lens driving device of the present invention, driving signals are supplied to the respective driving coils not from the supporting members 4a but from the terminals 25 via outlet lines, as described above. Thus, the supporting members 4a do not have to be insulated electrically from one another, but may be used as both ends thereof remain coupled to the connecting pieces 10, 10. Since there is no limitation to the materials making up the supporting members 4a, insofar as the electrical resistance is concerned, any suitable material that is readily available, inexpensive and amenable to working, and that is not subjected to resonant oscillations in the operating frequency range, may be used. The present objective lens driving device uses stainless material (chromium alloys), such as 'SUS301' or 'SUS304' as prescribed by JIS (Japan Industrial Standard) as such material satisfying the above requirements.

Figure 7:
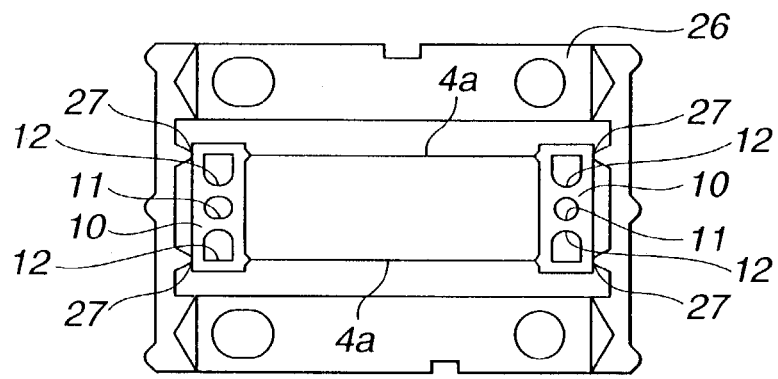
FIG. 7 is a plan view showing the status in the course of manufacturing a supporting member forming the objective lens driving device.
Figure 8:
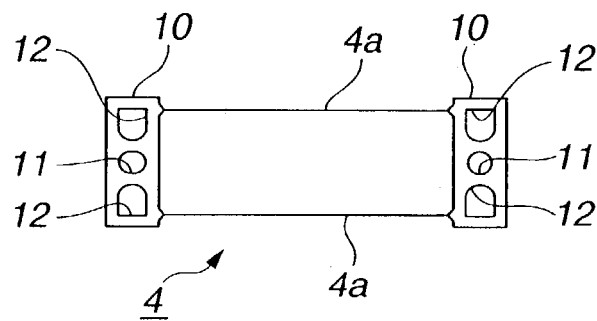
FIG. 8 is a plan view showing the supporting member used in the objective lens driving device according to the present invention.

In forming the supporting members 4a from such material, a plate member of stainless material, about 80 μm in thickness, as a rectangular frame 26, is formed on punching. The two supporting members 4a, 4a and the connecting pieces 10, 10 on both ends of the supporting members 4a, 4a are connected to the rectangular frame 26 via two straitened portions 27, on each of both ends of the frame 26 within the boundaries of the rectangular frame 26, as shown in FIG. 7. The positioning holes 11 and the bonding holes 12, 12 are simultaneously formed on punching. The straitened portions 27 of the member shown in FIG. 7 are cut to complete elastic supporting units 4, 4, having supporting members 4a, both ends of which are interconnected by the connecting pieces 10, 10, as shown in FIG. 8.

The elastic supporting units 4, 4 remain connected at both ends by the connecting pieces 10, 10, even after disconnection from the frame 26, and hence are not subjected to distortion or flexure. Depending on the precision of a metal mold, used for punching, high precision machining may be achieved as to the pitch between the two supporting members 4a, 4a or the location of the positioning holes 11.

A large number of the elastic supporting units 4, still remaining connected to the frames 26, may be stacked for packaging and transport. The elastic supporting units 4, 4, connected to the frame 26, are in the form of a flat sheet with a thickness on the order of 80 µm, are not bulky on being stacked, while being not liable to distortion. Since thee is no necessity of employing dedicated packaging materials, the transport efficiency may be improved. Meanwhile, the elastic supporting unit 4, used in the present invention, is approximately 80 to 90 µm in width and approximately 15 to 20 mm in length.

Figure 10:
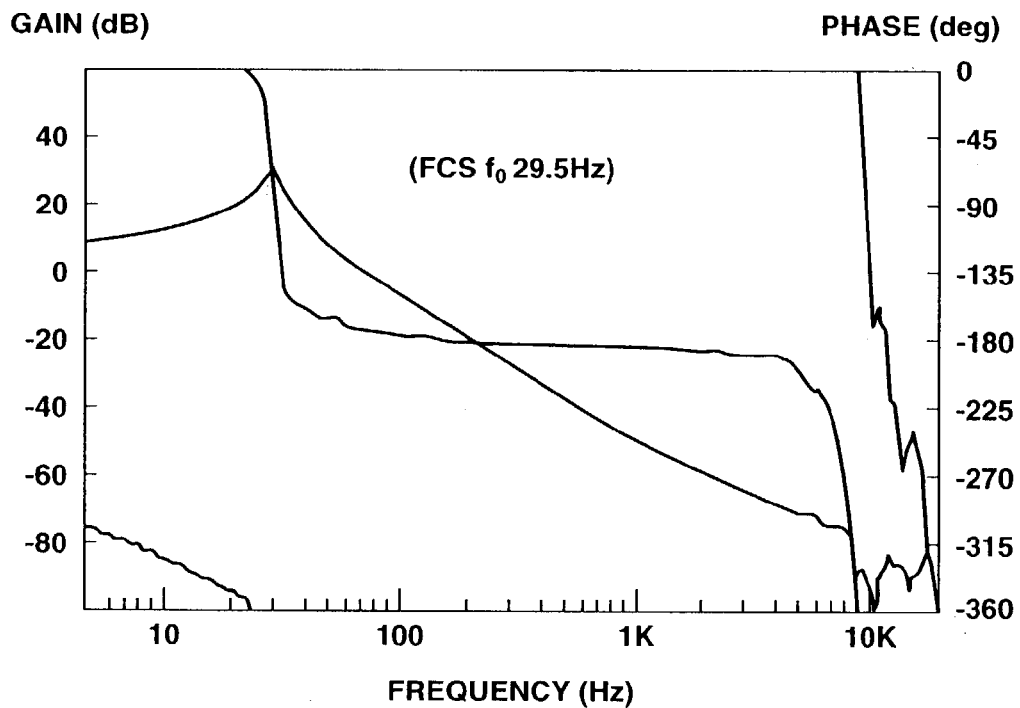
FIG. 10 is a graph showing oscillation characteristics of a movable unit of the objective lens driving device of the present invention in a direction parallel to the optical axis of the objective lens.
Figure 11:
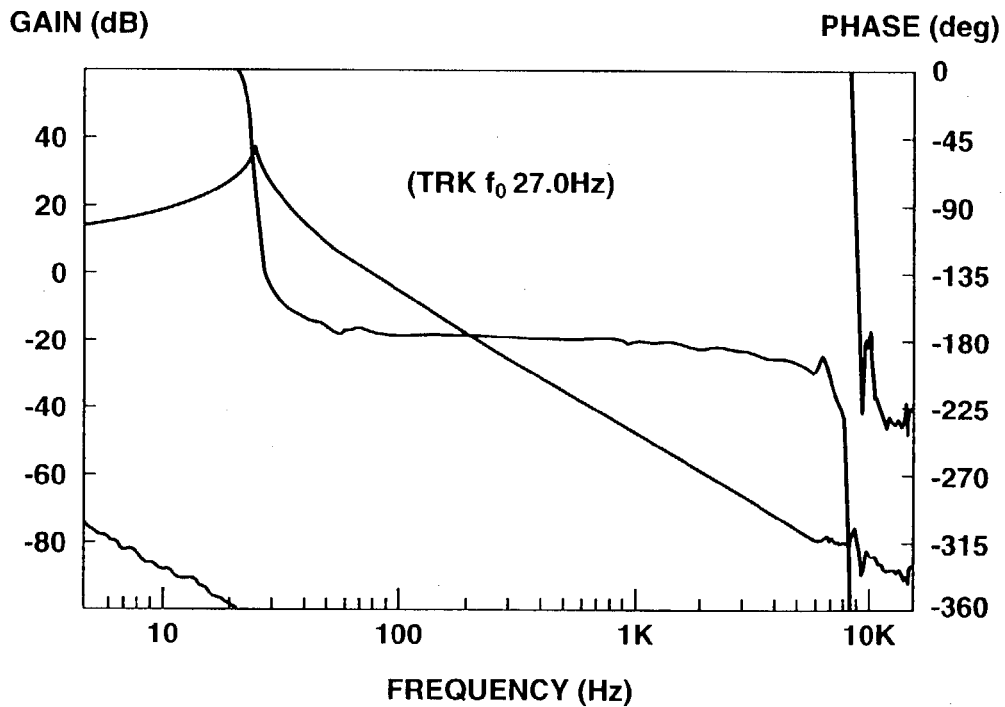
FIG. 11 is a graph showing oscillation characteristics of the movable unit in a planar direction perpendicular to the optical axis of the objective lens.
Figure 12:
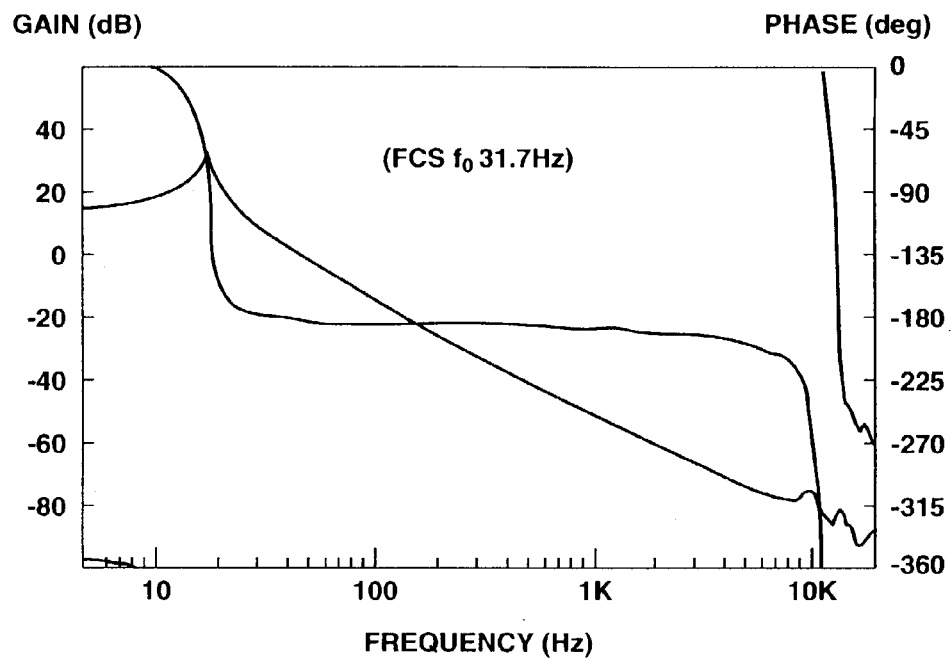
FIG. 12 is a graph showing oscillation characteristics of a movable unit of a conventional objective lens driving device in a direction parallel to the optical axis of an objective lens.
Figure 13:
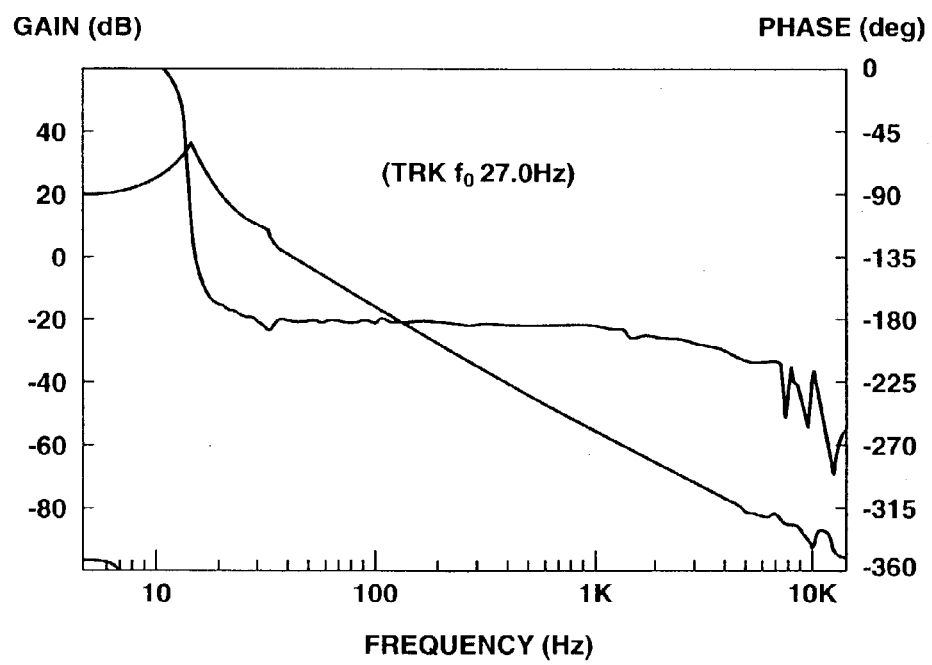
FIG. 13 is a graph showing oscillation characteristics of the movable unit in a planar direction perpendicular to the optical axis of the objective lens.

As for oscillation characteristics of the movable unit of the optical pickup device, the resonance frequency (f0) in a direction parallel to the optical axis of the objective lens 2 (FCS) is 29.5 Hz, as shown in FIG. 10, while the resonance frequency (f0) in the planar direction perpendicular to the optical axis of the objective lens 2 is 27.0 Hz, as shown in FIG. 11, with the phase conditions also being optimum for both cases. As for the oscillation characteristics of an objective lens driving device of a Comparative Example, having the same structure as that described above, and in which the supporting member 4 is formed of beryllium copper (an alloy of beryllium and copper containing not more than about 3% of beryllium), the resonance frequency (f0) in a direction parallel to the optical axis of the objective lens 2 (FCS) is 31.7 Hz, as shown in FIG. 12, while the resonance frequency (f0) in the planar direction perpendicular to the optical axis of the objective lens 2 (TRK) is 27.0 Hz, as shown in FIG. 13.

Thus, with the objective lens driving device of the present invention, employing a stainless material, as the material of the supporting member 4, it is possible to achieve oscillation characteristics which are approximately equivalent to those of the device in which the supporting member is formed of beryllium copper. The results of our experiments have indicated that the stainless material used as the material of the supporting member 4 as in the present invention is also equivalent to beryllium copper as to shock proofness and durability.

The objective lens driving device of the present invention is not limited to the above-described embodiments but may be constructed such that the magnetic circuit unit composed of the yoke and the magnet is mounted on the base member, with the focusing and tracking driving coils then being mounted on the lens bobbin. In such case, focusing control and tracking control may be achieved by the interaction between the respective driving coils and the magnetic circuit unit. In this case, the supporting members are not used as feeder lines for supplying the driving signals to the respective driving coils and are formed of stainless materials to realize optimum oscillation characteristics.

In the present objective lens driving device, the driving signals are sent to the respective driving coils via a flexible substrate interconnecting the lens bobbin and the base member. This flexible substrate is formed by a base plate of, for example, polyimide resin, exhibiting flexibility and thermal resistance, and a preset electrically conductive pattern formed thereon. The respective driving coils are connected to the electrically conductive pattern on the flexible substrate, and are fed with driving signals via the flexible substrate.

Figure 9:
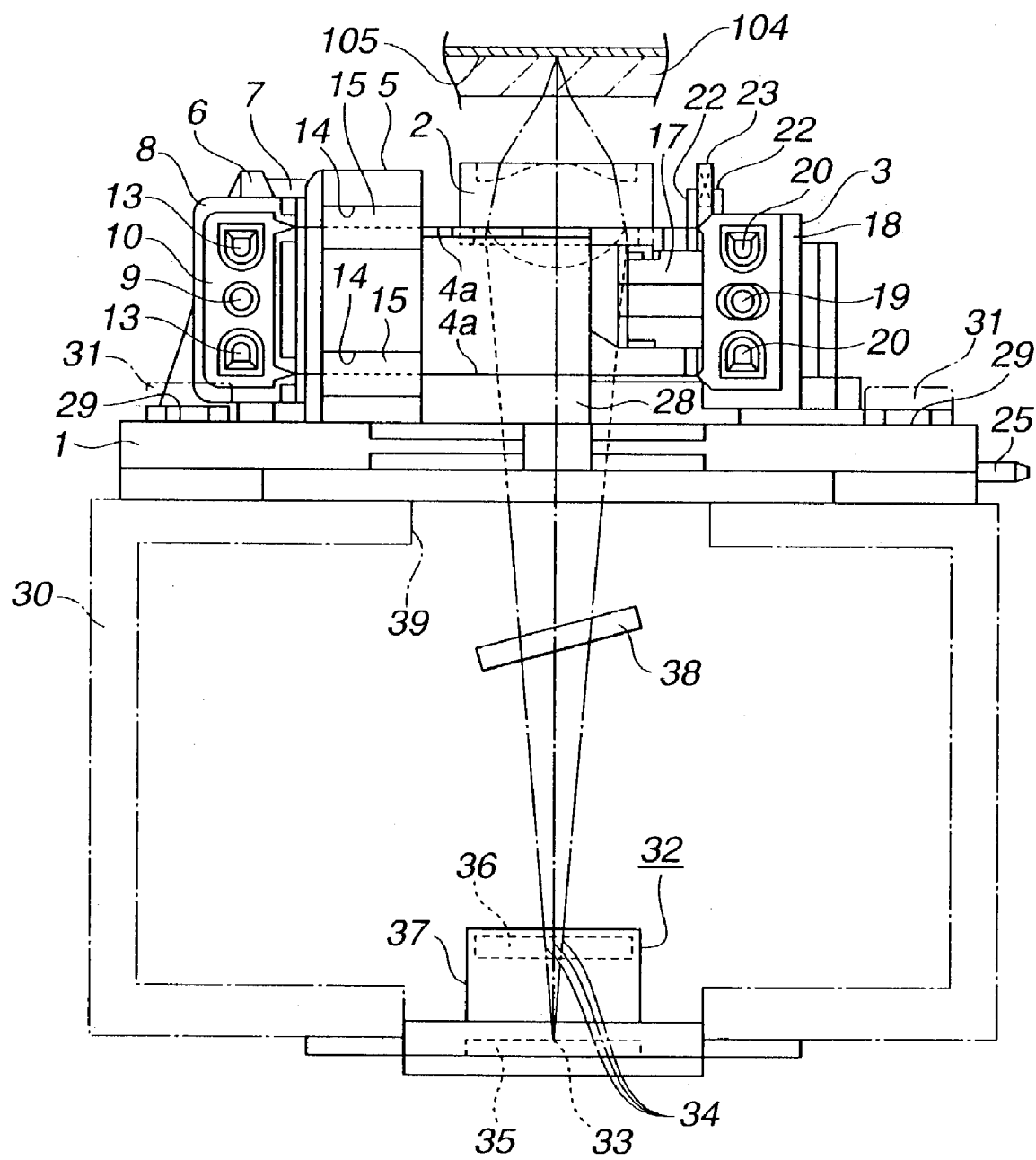
FIG. 9 is a longitudinal cross-sectional view showing an optical pickup device according to the present invention.

Referring to FIG. 9, the optical pickup device of the present invention includes a main body unit 30, on which is mounted the base member 1 of the objective lens driving device described above. The base member 1 is mounted on this main body unit 30 via set screws 31 threaded into four tapped holes 29 provided at its four corners.

Within the main body unit 30 is enclosed a hologram laser device 32, which is made up by substrate 35, carrying a semiconductor laser element 33, as a light source, and a photodiode 34, as a light receiving element, a hologram optical element 36, and a housing 37, having the substrate and the hologram optical element enclosed therein. The hologram optical element 36 separates the light beam radiated from the semiconductor laser element 33, from the light beam reflected back from the optical recording medium, as later explained, and outputs the light reflected back from the optical recording medium towards the photodiode 34.

With this optical pickup device, the light beam radiated from the semiconductor laser element 33 is transmitted through the hologram optical element 36 and through an astigmatism correction plate 38 so as to be radiated through an upper through-hole 39 formed in the upper surface of the main body unit 30. The astigmatism correction plate 38 is a plan-parallel plate, arranged at an angle with respect to the optical axis of the light beam output from the semiconductor laser element 33, and corrects the astigmatism proper to the light beam transmitted therethrough. The light beam radiated from the through-hole 39 of the main body unit 30 is transmitted through the through-hole formed in the mid portion of the base member 1 to fall on the objective lens 2.

The light beam incident on the objective lens 2 is illuminated so as to be converged on a signal recording surface 105 of an optical recording medium 104, such as an optical disc. This light beam is modulated as to strength or direction of polarization, depending on the information signals recorded on the signal recording surface 105, so as to be reflected by a reflection layer lined on the signal recording surface 105. The light beam reflected back from the reflection layer of the optical recording medium 104 is re-incident through the objective lens 2 to the main body unit 30. The light beam reflected back from the optical recording medium 104 falls on the hologram optical element 36 through the astigmatism correction plate 36. In this hologram optical element 36, the light beam returned from the optical recording medium 104 is deflected with respect to the optical return path to the semiconductor laser 36 to fall on the photodiode 34.

The photodiode 34 receives the reflected light from the optical recording medium 104, deflected by the hologram optical element 36, to output electrical signals corresponding to the state of modulation in this light beam. It is possible to generate readout signals of the information signals, recorded on the optical recording medium 104, based on the output signal of the photodiode 34. From the output signal of the photodiode 34, focusing error signals and tracking error signals are generated by an error signal generating circuit. Based on the so generated focusing error signals and tracking error signals, focusing servo and tracking servo signals are generated by the servo circuit. The so generated focusing servo and tracking servo signals are sent to the focusing driving coils 22, 22 and to the tracking driving coils 23, 23, as described above.

In this optical pickup device, the objective lens driving device causes movement of the objective lens 2, by the respective driving coils 22, 23 and the magnetic circuit unit, in the focusing direction parallel to the optical axis of the objective lens 2 and in the planar tracking direction perpendicular to this optical axis, such as to cause the light converging point of the light beam from the semiconductor laser device 32 to follow a recording track on the signal recording surface 105 of the optical recording medium 104 by the objective lens 2.

That is, in the present objective lens driving device, the objective lens 2 is moved in a direction parallel to the optical axis of the objective lens 2 to cause the light beam radiated from the semiconductor laser device 33 as the light source to follow the up-and-down movement of the optical recording medium 104 so as to be converged on the signal recording surface 105 by way of focusing control. In this objective lens driving device, the objective lens 2 is also moved in a direction perpendicular to a tangential line drawn to a recording track in the planar direction orthogonal to the optical axis of the objective lens 2 to cause the light converging point of the light beam radiated from the semiconductor laser device 33 as the light source to follow up with eccentricities of the optical recording medium 104 so as to follow the recording track by way of tracking control.

In the above-described focusing control and tracking control, the focusing error signals corresponding to the distance between the light beam converging point and the signal recording surface 105, and the tracking error signals corresponding to the distance between the light beam converging point and the recording track, are generated, based on the output signal from the photodiode 34. The focusing servo signals and the tracking servo signals are sent as driving signals to the focusing driving coils 22, 22 and to the tracking driving coils 23, 23, based on these focusing error signals and tracking error signals.

INDUSTRIAL APPLICABILITY

With the above-described objective lens driving device, according to the present invention, in which the power can be supplied to the driving coils without employing the supporting members, adapted for movably supporting the lens bobbin, as feeder lines for the driving coils, it becomes possible to formed the supporting members of a stainless material, to enlarge the gamut for the selection of the materials used for forming the supporting members and to realize optimum oscillation performance required of the objective lens driving device.

Since the gamut for the selection of the materials for the supporting members, is now wider, it becomes possible to use a stainless material, which is less costly than other metals, to render it possible to manufacture the apparatus itself inexpensively.

That is, with the present invention, such an objective lens driving device may be provided in which linear supporting members, supporting the lens bobbin, can be formed easily, the supporting members can be packaged and transported easily and in which the materials of the supporting members are readily available and inexpensive.

The invention claimed is:

1. An objective lens driving device comprising:
    a lens bobbin provided with an objective lens;
    a magnet provided on said lens bobbin;
    a coil unit for causing movement of said lens bobbin along with said magnet in a direction parallel to an optical axis of the objective lens and in a plane perpendicular to the optical axis of the objective lens;
    a stationary unit provided with said coil unit; and
    an elastic supporting unit formed of a stainless material, provided between said stationary unit and said lens bobbin for supporting said lens bobbin for movement in a direction parallel to the optical axis of said objective lens and in a plane perpendicular to the optical axis of said objective lens and including;
    a plurality of linear supporting members each having one end thereof mounted to said lens bobbin and having an opposite end mounted to said stationary unit,
    wherein said elastic supporting unit is formed as a first elastic supporting part and a second elastic supporting part, each said first and second elastic supporting part being respectively constructed having two connecting pieces, each of said two connecting pieces interconnecting ends of two supporting members, of said plurality of linear supporting members so that said two supporting members extend parallel to each other, and
    wherein said first and second elastic supporting parts are arranged parallel to each other on respective sides of said objective lens, so that said objective lens lies between said first and second elastic supporting parts.

2. The objective lens driving device according to claim 1 wherein said first and second elastic supporting parts are punch formed of a stainless sheet material into a stainless plate member.

3. The objective lens driving device according to claim 1 wherein said stationary unit has a plurality of grooves for receiving the opposite ends of said plurality of linear supporting members, and wherein a damper is provided in each groove in contact with the opposite end of the respective linear supporting member.

4. The objective lens driving device according to claim 1 wherein a substantially rectangular frame-shaped yoke is provided in said lens bobbin, two magnets are provided at a preset distance between two facing inner wall sections of said yoke and wherein said coil unit is provided between said magnets.

5. An objective lens driving device comprising:
    a stationary unit;
    a lens bobbin provided with an objective lens;
    a magnet provided on one of said lens bobbin and the stationary unit;
    a coil unit provided on the other of said lens bobbin and the stationary unit and adapted for supporting said lens bobbin for movement in a direction parallel to an optical axis of said objective lens and in a plane perpendicular to the optical axis of said objective lens; and
    an elastic supporting unit formed of a stainless material, provided between said stationary unit and the lens bobbin for supporting said lens bobbin for movement in a direction parallel to the optical axis of said objective lens and in a plane perpendicular to the optical axis of said objective lens, including
    a plurality of linear supporting members each having one end mounted to said lens bobbin and each having an opposite end mounted to said stationary unit
    wherein said elastic supporting unit includes a first elastic supporting part formed of two connecting pieces and a second elastic supporting part formed of two connecting pieces, each of said two connecting pieces interconnecting ends of two supporting members of said plurality of supporting members so that said two supporting members extend parallel to each other, and
    wherein said first and second elastic supporting parts are arranged parallel to each other on respective sides of said objective lens, so that said objective lens lies between said first and second elastic supporting parts.

6. The objective lens driving device according to claim 5 wherein said first and second elastic supporting parts are formed of a stainless sheet material punch formed into a stainless plate member.

7. The objective lens driving device according to claim 5 wherein said stationary unit has a plurality of grooves for receiving the opposite ends of said plurality of linear supporting members, and wherein a damper is provided in each groove in contact with the opposite end of the respective linear supporting member.

8. An optical pickup device comprising:
a light source;
an objective lens driving device including a lens bobbin, provided with an objective lens for converging a light beam radiated from said light source, a stationary unit having an opening for guiding the light beam radiated from said light source to said objective lens, a magnet mounted on one of said lens bobbin and said stationary unit, a coil unit provided on the other of said lens bobbin and said stationary unit and adapted for causing movement of said lens bobbin in a direction parallel to an optical axis of said objective lens and in a plane perpendicular to the optical axis of said objective lens, and an elastic supporting unit formed of a stainless material provided between said stationary unit and the lens bobbin for supporting said lens bobbin for movement in a direction parallel to the optical axis of said objective lens and in a plane perpendicular to the optical axis of said objective lens; and
a photodetector for detecting the light beam incident thereon via said objective lens, including
a plurality of linear supporting members each having its one end mounted to said lens bobbin and having a respective opposite end mounted to said stationary unit,
wherein said elastic supporting unit includes a first elastic supporting part constructed of two connecting pieces and a second elastic supporting part constructed two connecting pieces, each of said two connecting pieces interconnecting ends of two supporting member of said plurality of supporting members so that said two supporting members extend parallel to each other, and
wherein said first and second elastic supporting pieces are arranged parallel to each other on respective sides of said objective lens, so that said objective lens lies between said first and second elastic supporting pieces.

9. The objective lens driving device according to claim 8 wherein said first and second elastic supporting pieces are formed of a stainless sheet material punch formed into a stainless plate member.

10. The objective lens driving device according to claim 8 wherein said stationary unit has a plurality of grooves for receiving the opposite ends of said plurality of linear supporting members, and wherein a damper is provided in each groove in contact with the opposite end of the respective linear supporting members.

* * * * *

UNITED STATES PATENT AND TRADEMARK OFFICE
CERTIFICATE OF CORRECTION

PATENT NO. : 7,073,185 B2 Page 1 of 1
APPLICATION NO. : 10/258467
DATED : July 4, 2006
INVENTOR(S) : Yutaka Shimada and Tadayasu Nishikawa It is certified that error appears in the above-identified patent and that said Letters Patent is hereby corrected as shown below:

Title Page Delete Abstract and insert the following: On the face of the patent, item 57 should read --An objective lens driving device used in an optical pickup device includes a stationary unit, a lens bobbin provided with an objective lens, at least one magnet provided on one of the lens bobbin and the stationary unit, a coil unit provided on the other of the lens bobbin and the stationary unit for causing movement of the lens bobbin in a direction parallel to the optical axis of the objective lens and in a plane perpendicular to the optical axis of the objective lens, and an elastic supporting unit made of a stainless material, provided between a stationary unit and the lens bobbin. The elastic supporting unit supports the lens bobbin for movement in a direction parallel to the optical axis of the objective lens and in a plane perpendicular to the optical axis of the objective lens.

Column 5, line 48, change "member" to --members--.
Column 6, line 4, "direction formed" should read --direction from--.
Column 6, line 12, change "are carried" to --is carried--.
Column 7, line 2, change "is flexible" to --are flexible--.
Column 7, line 2, change "it is" to --they are--.
Column 7, line 67 change "ends" to --end--.
Column 9, line 6, change "thee" to --there--.
Column 11, line 33, "formed the supporting" should read --from the supporting--.
Column 11, line 39, delete comma after "members".
Column 12, line 6, delete comma after "members".
Column 14, line 3, insert --of-- between "constructed two".
Column 14, line 5, change "member" to --members--.

Signed and Sealed this

Seventeenth Day of April, 2007

JON W. DUDAS
*Director of the United States Patent and Trademark Office*